United States Patent
Kitagawa et al.

(10) Patent No.: US 10,531,446 B2
(45) Date of Patent: Jan. 7, 2020

(54) RADIO CONTROL DEVICE, TERMINAL DEVICE, AND COMMUNICATION METHOD

(71) Applicant: KDDI CORPORATION, Tokyo (JP)

(72) Inventors: Kouichiro Kitagawa, Fujimino (JP); Masashi Fushiki, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 15/592,900

(22) Filed: May 11, 2017

(65) Prior Publication Data

US 2017/0245254 A1 Aug. 24, 2017

Related U.S. Application Data

(63) Continuation of application No. PCT/JP2015/081861, filed on Nov. 12, 2015.

(30) Foreign Application Priority Data

Nov. 14, 2014 (JP) ................................. 2014-232178

(51) Int. Cl.
*H04W 72/04* (2009.01)
*H04W 8/00* (2009.01)
(Continued)

(52) U.S. Cl.
CPC ............ *H04W 72/042* (2013.01); *H04W 8/00* (2013.01); *H04W 8/005* (2013.01); *H04W 40/34* (2013.01);
(Continued)

(58) Field of Classification Search
CPC ....... H04W 76/02; H04W 8/00; H04W 40/34; H04W 72/04; H04W 72/042; H04W 92/18; H04W 76/14; H04W 8/005; H04W 88/04

See application file for complete search history.

(56) References Cited

U.S. PATENT DOCUMENTS

2013/0223398 A1* 8/2013 Li ..................... H04W 72/085
 370/329
2014/0206322 A1* 7/2014 Dimou .................. H04W 76/14
 455/414.1
(Continued)

FOREIGN PATENT DOCUMENTS

CN 103250435 A 8/2013
CN 103582069 A 2/2014
(Continued)

OTHER PUBLICATIONS

Extended European Search Report dated Oct. 5, 2017, issued in corresponding European Patent Application No. 15859943.1. (12 pages).
Ericsson; "Mobility for D2D UEs"; 3GPP Draft; R3-132277; 3rd Generation Partnership Project (3GPP); Nov. 13, 2013 (6 pages).
"3rd Generation Partnership Project; Technical Specification Group Radio Access Network; Study on LTE Device to Device Proximity Services; Radio Aspects (Release 12)"; 3 GPP Draft; 36843-C01; 3rd Generation Partnership Project (3GPP); Mar. 27, 2014 (12 pages).
(Continued)

*Primary Examiner* — Kyaw Z Soe
(74) *Attorney, Agent, or Firm* — Fitch, Even, Tabin & Flannery LLP

(57) ABSTRACT

In a communication system capable of executing terminal-to-terminal communication in which wireless communication is performed directly without an intervention of a base station device between a first terminal device that is in a state in which cellular communication with the base station device can be executed and a second terminal device that is not in the state in which cellular communication with the base station device can be executed, the base station device generates control information necessary for the first terminal device to search for the second terminal device, and transmits the generated control information to the first terminal device.

10 Claims, 10 Drawing Sheets

(51) Int. Cl.
*H04W 40/34* (2009.01)
*H04W 88/04* (2009.01)
*H04W 92/18* (2009.01)
*H04W 76/14* (2018.01)

(52) U.S. Cl.
CPC .......... *H04W 72/04* (2013.01); *H04W 76/14* (2018.02); *H04W 88/04* (2013.01); *H04W 92/18* (2013.01)

(56) References Cited

U.S. PATENT DOCUMENTS

| | | | |
|---|---|---|---|
| 2014/0219261 | A1 | 8/2014 | Johnsson |
| 2014/0307611 | A1* | 10/2014 | Tesanovic ............. H04W 76/14 370/312 |
| 2015/0222401 | A1 | 8/2015 | Xu et al. |

FOREIGN PATENT DOCUMENTS

| | | |
|---|---|---|
| CN | 103686691 A | 3/2014 |
| EP | 2 785 092 A1 | 3/2013 |
| EP | 2 790 456 A1 | 4/2013 |
| EP | 2925067 B1 | 2/2018 |
| JP | 2013-30867 A | 2/2013 |

OTHER PUBLICATIONS

International Search Report dated Feb. 2, 2016 for PCT/JP2015/081861 and English translation of the same. (4 pages).
3GPP TR23.703 Ver.0.4.1, "study on architecture enhancements to support proximity services (ProSe)", Jane 2013 (85 pages).
3GPP TR36.843 Ver.12.0.1, "Study on LTE Device to Device Proximity Services", Mar. 2014 (50 pages).
Kyocera, Consideration of Inter-cell D2D Service, 3GPP TSG-RAN WG2#85bis R2-141386, Mar. 31, 2014, passage 2.2 (5 pages).
ZTE, Discussion of D2D Discovery, 3GPP TSG-RAN WG1#74 R1-133149, Aug. 19, 2013, p. 3/10 (10 pages).
ETRI, Resource allocation for Type 2 discovery, 3GPP TSG-RAN WG2#86 R2-142702, May 19, 2014 (4 pages).
ITRI, Discussion on Access Control for ProSe D2D Service, 3GPP TSG-RAN WG2#87bis R2-144505, Aug. 6, 2014 (3 pages).
Ericsson, Broadcast of proSe Control Information and Related Procedures, 3GPP TSG-RAN WG2#86 R2-142604, May 19, 2014, chapters 1, 4 (6 pages).
CNIPA; Application No. 201580061708.0; Chinese Office Action dated Sep. 4, 2019.

* cited by examiner

RADIO CONTROL DEVICE, TERMINAL DEVICE, AND COMMUNICATION METHOD

CROSS-REFERENCE TO RELATED APPLICATIONS

This application is a continuation of International Patent Application No. PCT/JP2015/081861 filed on Nov. 12, 2015, and claims priority to Japanese Patent Application No. 2014-232178 filed on Nov. 14, 2014, the entire content of both of which is incorporated herein by reference.

TECHNICAL FIELD

The present invention relates to a radio control device, a terminal device, and a communication method and, more particularly, to a radio control device, a terminal device, and a communication method for performing direct communication between terminal devices in a wireless communication system.

BACKGROUND ART

In E-UTRAN (Evolved Universal Terrestrial Radio Access Network), discussions have recently taken place concerning device-to-device communication (to be referred to as D2D communication hereinafter) that is a technique of allowing a plurality of terminal devices (User Equipment: to be referred to as UE hereinafter) to do direct communication without an intervention of a base station device.

D2D communication is executed using, for example, some of radio resources used in uplink of cellular communication such as LTE. The distance between terminal devices to which the D2D communication can be applied is said to be several hundred m. In 3GPP (3rd Generation Partnership Project) Release 12, a method of causing a terminal device to detect a terminal located in the vicinity and a method of broadcasting data to unspecified terminal devices have been proposed (for example, see NPL 1 or 2).

CITATION LIST

Non Patent Literature

NPL 1: 3GPP TR23.703 Ver.0.4.1, "study on architecture enhancements to support proximity services (ProSe)", June, 2013

NPL 2: 3GPP TR36.843 Ver.12.0.1 "Study on LTE Device to Device Proximity Services", March, 2014

SUMMARY OF INVENTION

Technical Problem

When the above-described technique of D2D communication is used, a terminal device (to be referred to as an "out-of-area terminal" hereinafter) that is not under the control of a base station device can be connected to a wireless network via a terminal device (to be referred to as a "relay terminal" hereinafter) that is under the control of the base station device. However, in the conventional technique, there is no means for causing the terminal device under the control of the base station device to know the presence of the out-of-area terminal.

The present invention has been made in consideration of the above-described problem, and has as its object to provide a radio control device and a communication method capable of efficiently connecting an out-of-area terminal that is not under the control of a base station device to a wireless network.

Solution to Problem

According to an aspect of the present invention, there is provided a radio control device for controlling terminal-to-terminal communication in which wireless communication is performed directly without an intervention of a predetermined base station device between a first terminal device that is in a state in which wireless communication with the predetermined base station device can be executed and a second terminal device that is not in the state in which wireless communication with the predetermined base station device can be executed, comprising a control unit configured to generate control information necessary for the first terminal device to search for the second terminal device, and a communication unit configured to transmit the control information generated by the control unit to the first terminal device. The first terminal device may be a relay terminal, and the second terminal device may be an out-of-area terminal.

According to this aspect, the radio control device notifies the first terminal device of the control information necessary to search for the second terminal device and instructs the first terminal device to do the search, thereby efficiently connecting the second terminal device that is not under the control of the base station device to a wireless network via the first terminal device. Note that the radio control device includes, for example, E-UTRAN, and means a concept including a base station device or a host apparatus thereof.

As the control information, the control unit may generate information including one of transmission setting information used to transmit a search signal from the first terminal device to the second terminal device and waiting setting information used by the first terminal device to wait for the search signal from the second terminal device. In addition, the control unit may include a search signal transmission period and a timer concerning a time limit of search signal transmission in the transmission setting information, or may include radio resource information to be waited and a timer concerning a waiting time limit in the waiting setting information. According to this aspect, the first terminal device can efficiently search for the second terminal device.

The communication unit may transmit the control information to the first terminal device by a broadcast signal. The communication unit may transmit the control information including information about an access type to the first terminal device, and to cause a terminal device that has received a signal from the communication unit to determine whether to start searching for the second terminal device, the control unit may set, as the access type, an access type to be given to a terminal device permitted to do an operation of searching for the second terminal device. According to this aspect, the base station device can efficiently designate the relay terminal device.

The communication unit may transmit the control information to a terminal device located in an adjacent cell and/or a second adjacent cell to a cell of the base station device in addition to all first terminal devices located in the cell of the base station device. The communication unit may transmit the control information when one of signal quality of a communication link of the terminal-to-terminal communication between the first terminal device and the second terminal device and signal quality of a communication link between the first terminal device and the base station device is not more than a predetermined threshold, or when the terminal-to-terminal communication has abnormally ended. In response to a terminal change request from the first terminal device, the communication unit may transmit the control information to a terminal device that should newly be a relay terminal. According to this aspect, the base station device can notify the control information at a necessary timing and efficiently search for the second terminal device.

According to another aspect of the present invention, there is provided a terminal device that performs terminal-to-terminal communication in which wireless communication with a relay terminal device that is in a state in which wireless communication with a first base station device can be executed is performed directly without an intervention of the first base station device, and can execute wireless communication with a second base station device capable of communicating with the first base station device via a wired network, comprising a communication unit configured to receive, from the second base station device, search information notified from the first base station device to the second base station device to search for the relay terminal device, and a control unit configured to execute control to search for the relay terminal device using the search information received by the communication unit. The communication unit may receive, as the search information, search information including a search signal transmission period, a transmission time limit timer concerning a time limit of search signal transmission, radio resource information to be waited, and a waiting time limit timer concerning a time limit of waiting, and the control unit may control to transmit a search signal in accordance with the transmission period and the transmission time limit timer, and may control to wait for a response signal to the search signal in accordance with the radio resource information and the waiting time limit timer. If the second base station device is in a state in which communication with the first base station device via the wired network cannot be executed, the control unit may control to transmit the search signal to the relay terminal device only when one or both of a condition that the terminal-to-terminal communication with the relay terminal device is permitted in advance and a condition that an appropriate connection destination cell does not exist are met. According to this aspect, even the second terminal device serving as an out-of-area terminal searches for the relay terminal device as far as possible. As a result, two terminal devices in a terminal-to-terminal device can efficiently be searched for.

According to still another aspect of the present invention, there is provided a communication method in a communication system including a first terminal device that is in a state in which wireless communication with a base station device can be executed, a second terminal device that is not in the state in which wireless communication with the base station device can be executed, and a radio control device configured to control terminal-to-terminal communication in which wireless communication is performed directly between the first terminal device and the second terminal device without an intervention of the base station device. The radio control device generates control information necessary for the first terminal device to search for the second terminal device, and transmits the generated control information to the first terminal device. The first terminal device receives the control information transmitted from the radio control device, and searches for the second terminal device in accordance with the control information. The second terminal device responds to the control information received from the first terminal device. Here, the first terminal device executes the terminal-to-terminal communication with the second terminal device if a response from the second terminal device is received during a waiting period.

Note that an arbitrary combination of the above-described constituent elements or the expression of the present invention, which is converted between an apparatus, a system, a computer program, and the like, is also effective as an aspect of the present invention.

Advantageous Effects of Invention

According to the present invention, it is possible to provide a radio control device and a communication method capable of efficiently connecting an out-of-area terminal that is not under the control of a base station device to a wireless network.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Outline of Present Invention

The outline of the present invention will be described first before an explanation of the examples of the present invention. The present invention provides a method of efficiently connecting an out-of-area terminal that is not under the control of a base station device to a wireless network via a terminal device that is under the control of the base station device using a technique of D2D communication in which terminal devices directly perform wireless communication. A radio control device according to the present invention generates control information concerning an operation of causing a terminal device under the control of a base station device to search for a terminal device that is not under the control of the base station device, and transmits the generated control information to the terminal device that is under the control of the base station device. The control information includes, for example, a condition to cause the terminal device that is under the control of the base station device to transmit a search signal or a condition to cause the terminal device that is under the control of the base station device to wait for a search signal from the terminal device that is not under the control of the base station device. When the terminal device under the control of the base station device is thus made to function as a relay terminal, the out-of-area terminal that is not under the control of the base station device can be connected to a wireless network via the relay terminal.

In the conventional technique, there is no means for causing the terminal device under the control of the base station device to know the presence of the out-of-area terminal. In addition, the out-of-area terminal cannot know resource information for D2D communication used in the communication range of the base station device, and cannot know the presence of the relay terminal that enables connection to the wireless network. For this reason, the base station device or terminal device can provide a wireless access to the out-of-area terminal only by an inefficient and incorrect method of, for example, transmitting a search signal at random.

The present invention solves the above-described problems. The out-of-area terminal that is not under the control of the base station device can efficiently be connected to the wireless network by causing, from the wireless network side, the terminal device that is under the control of the base station device to search for the out-of-area terminal.

Example of Arrangement of Wireless Communication System

Figure 1:
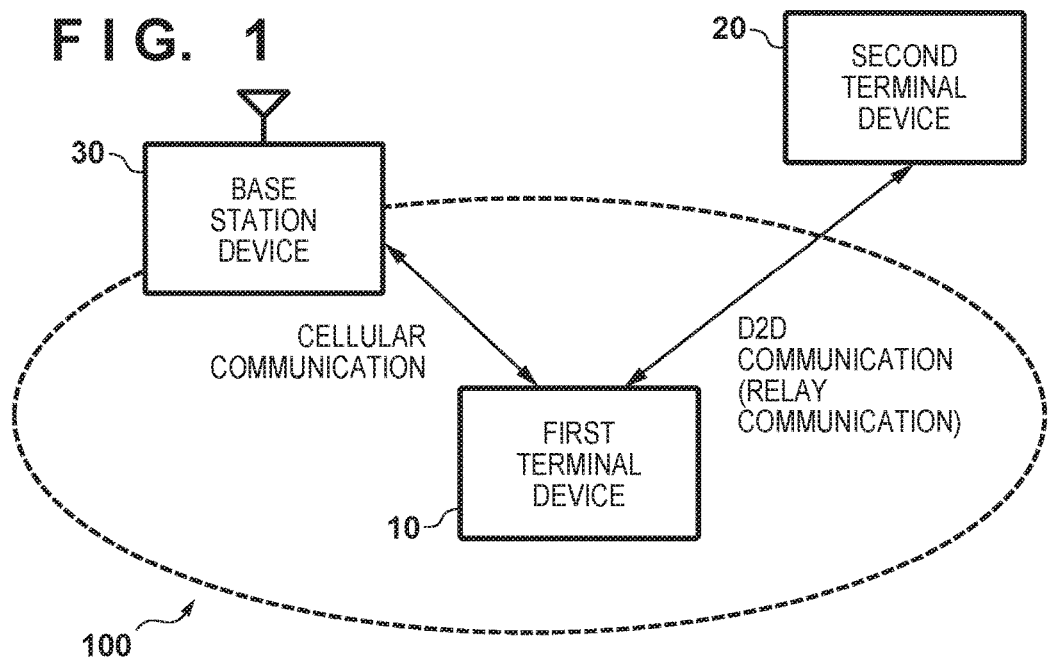
FIG. 1 is a block diagram showing an example of the arrangement of a wireless communication system according to an embodiment of the present invention.

FIG. 1 is a block diagram showing an example of the arrangement of a wireless communication system according to an embodiment of the present invention. A wireless communication system 100 includes a first terminal device 10, a second terminal device 20, and a base station device (E-UTRAN) 30. Note that for a descriptive convenience, cellular communication will be explained as an example. However, the present invention is not limited to this, and those skilled in the art can easily understand that the present invention can also be applied to communication by a wireless LAN system or short distance wireless communication such as infrared communication.

The wireless communication system 100 includes the first terminal device 10 that is in a state in which wireless communication with the base station device 30 can be executed, the second terminal device 20 that is not in the state in which wireless communication with the base station device 30 can be executed, and the base station device 30 that controls D2D communication in which the first terminal device 10 and the second terminal device 20 directly perform wireless communication without an intervention of the base station device 30. The base station device 30 generates control information necessary for the first terminal device 10 to search for the second terminal device 20, and transmits the generated control information to the first terminal device 10. The first terminal device 10 receives the control information transmitted from the base station device 30, and searches for the second terminal device 20 in accordance with the control information. The second terminal device 20 responds to the control information received from the first terminal device 10. If a response from the second terminal device 20 is received during the waiting period, the first terminal device 10 executes D2D communication with the second terminal device 20.

More specifically, the first terminal device 10 is under the control of the base station device 30 and is in a state in which the terminal device can execute cellular communication with the base station device 30. On the other hand, the second terminal device 20 is not under the control of the base station device 30. For this reason, the second terminal device 20 is not in a state in which the terminal device can execute cellular communication with the base station device 30, and therefore cannot be connected to the wireless network. Hence, this embodiment provides a method of searching for the second terminal device 20 as an out-of-area terminal that is not under the control of the base station device 30 using the first terminal device 10 that is under the control of the base station device 30 as a relay terminal. By the search, D2D communication without an intervention of the base station device 30 is performed between the first terminal device 10 and the second terminal device 20, thereby making the second terminal device 20 connectable to the wireless network via the first terminal device 10. The first terminal device 10 will also be referred to as a relay terminal, the second terminal device 20 as an out-of-area terminal, and D2D communication between the first terminal device 10 and the second terminal device 20 as relay communication hereinafter for the descriptive convenience.

Example of Arrangement of Terminal Device

Figure 2:
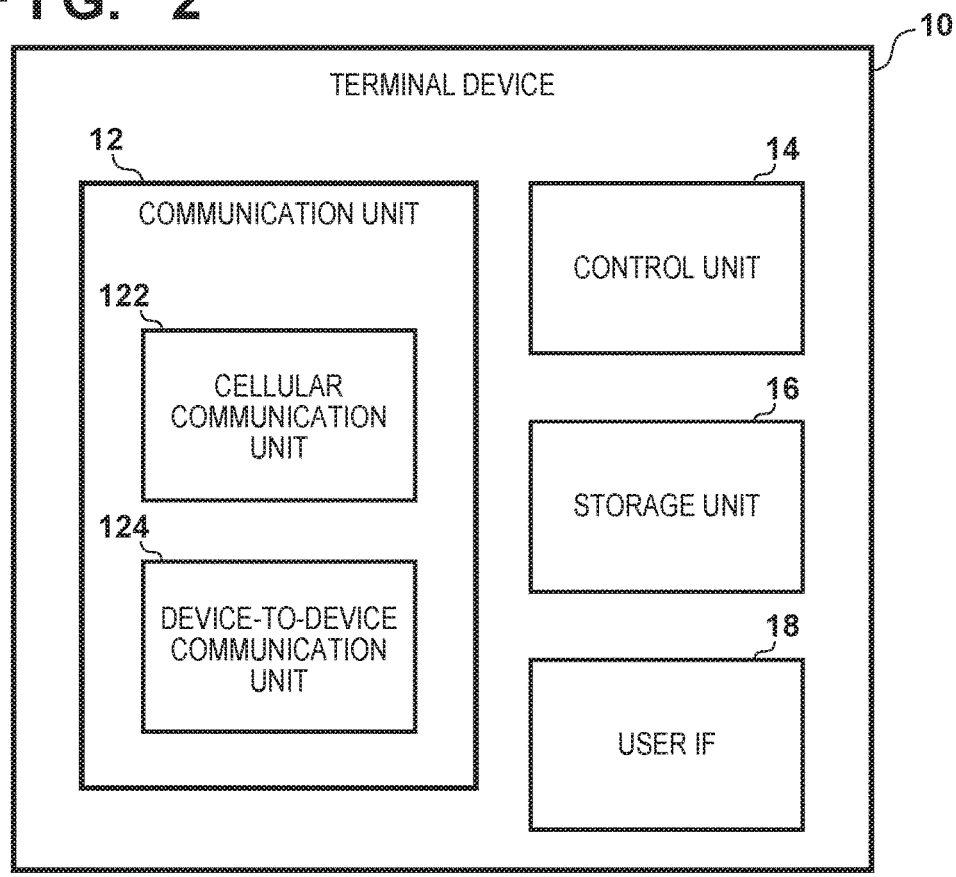
FIG. 2 is a block diagram showing an example of the arrangement of a first terminal device shown in FIG. 1.

FIG. 2 is a block diagram showing an example of the arrangement of a terminal device used as the first terminal device 10 and the second terminal device 20 shown in FIG. 1. The terminal device includes a communication unit 12, a control unit 14, a storage unit 16, and a user interface (user IF) 18.

The communication unit 12 includes a cellular communication unit 122 and a device-to-device communication unit 124. The cellular communication unit 122 performs wireless communication with the base station device 30. The device-to-device communication unit 124 directly communicates with a terminal device as the partner of D2D communication without an intervention of the base station device 30 using a radio resource for D2D communication assigned by the base station device. These communication processes may be done using a known modulation/demodulation technology or antenna technology.

The storage unit 16 may store data transmitted from the base station device 30 or the terminal device as the partner of D2D communication, or may store data that is obtained via the user IF 18 and should be transmitted to the base station device 30 or the terminal device as the partner of D2D communication. The user IF 18 may include a screen interface, an input interface such as an operation button or a touch panel configured to receive an input from the user, and an image capturing means such as a camera.

The control unit 14 is formed by, for example, a CPU and generally controls the units using information received from the cellular communication unit 122 or the device-to-device communication unit 124 or information stored in the storage unit 16.

There are two types of connected states between the terminal device and the base station device, that is, a connected state (RRC_CONNECTED state) in RRC (Radio Resource Control) for controlling the wireless network and an idle state (RRC_IDLE state).

The RRC_IDLE state represents a state in which radio resources are not managed by the base station device. In this state, only limited functions such as monitoring of a paging channel, reception of ETWS (Earthquake and Tsunami Warning System) information, measurement of radio quality of a peripheral cell, cell selection/reselection, and system information acquisition are active to minimize power consumption.

RRC_CONNECTED state represents a state in which radio resources are managed by the base station device, and the terminal device can transmit/receive data. Not only the processes in the RRC_IDLE state but also functions such as data transmission/reception and feedback of information such as CQI (Channel Quality Indicator) to the base station device can be executed. A state transition from the RRC_IDLE state to the RRC_CONNECTED state occurs when a paging signal is received.

Based on, for example, reception of a paging signal, the first terminal device 10 receives, from the base station device 30, control information concerning an operation of searching for the out-of-area terminal. The control information includes, for example, a condition to transmit a search signal to search for the out-of-area terminal or a condition to wait for a search signal transmitted from the out-of-area terminal. More specifically, the control information can include an arbitrary combination of following pieces of information.

Search signal transmission/waiting period
Search signal transmission/waiting duration (timer value)
Search signal transmission/waiting resource position
Search signal transmission/waiting frequency band If the control information is received from the base station device 30, the control unit 14 starts connection waiting for relay communication and performs transmission/waiting of a search signal using a resource designated by the control information. If a search signal transmission/waiting period and a search signal transmission/waiting duration are designated, transmission/waiting of a search signal can be performed periodically for a predetermined time. If a response to the search signal is received from the second terminal device 20 during the waiting period, the first terminal device 10 executes connection processing to execute D2D communication with the second terminal device 20. If the connection processing for relay communication by a D2D link with the found out-of-area terminal is completed, the control unit 14 performs a location registration procedure of the found out-of-area terminal to the base station device 30.

When the terminal device functions as a relay terminal, the control unit 14 relays a broadcast message or control message from the base station device 30 to the out-of-area terminal of the partner of D2D communication. Accordingly, even the out-of-area terminal that is not in a state in which it can execute cellular communication with the base station device 30 can indirectly receive the broadcast message or control message from the base station device 30. If a control message including radio resource information to be used for D2D communication is indirectly received from the base station device 30 by the cellular communication unit 122, the control unit 14 executes D2D communication with the terminal device of the partner by the device-to-device communication unit 124 using the assigned radio resource.

In addition, the control unit 14 measures the radio quality of the downlink for each cell of the base station device 30 and base station devices on the periphery using a radio signal received by the cellular communication unit 122. For example, in the LTE system, RSRP (Reference Signal Received Power) and/or RSRQ (Reference Signal Received Quality) of a reference signal is measured as radio quality. The control unit 14 reports radio quality information including the identifier (ID) of each cell and measured radio quality to the base station device 30 by a measurement report as needed.

In some cases, the second terminal device 20 that is the out-of-area terminal can execute wireless communication with a second base station device capable of communicating with the first base station device 30 via a wired network while performing D2D communication to directly perform wireless communication without an intervention of the first base station device 30 with the relay terminal device in a state in which the terminal device can execute wireless communication with the first base station device 30. Note that the wired network includes a public network such as the Internet as well as a logically defined connection channel such as an X2 interface or S1 interface.

In this case, the communication unit 12 receives, from the second base station device, search information notified from the first base station device 30 to the second base station device to search for the relay terminal device 10. As the search information, the communication unit 12 may receive search information including a search signal transmission period, a transmission time limit timer concerning the time limit of search signal transmission, radio resource information to be waited, and a waiting time limit timer concerning the time limit of waiting.

The control unit 14 executes control to search for the relay terminal device 10 using the search information received by the communication unit 12. The control unit 14 may also control to transmit a search signal in accordance with the transmission period and the transmission time limit timer and control to receive a response signal for the search signal in accordance with the radio resource information and the waiting time limit timer.

On the other hand, conversely to the above case, if the second terminal device is in a state in which it cannot communicate with the first base station device 30 via the wired network, the control unit 14 may control to transmit the search signal to the relay terminal device 10 only when one or both of a condition that D2D communication with the relay terminal device 10 is permitted in advance and a condition that an appropriate connection destination cell cannot be found are met.

Example of Arrangement of Base Station Device

Figure 3:
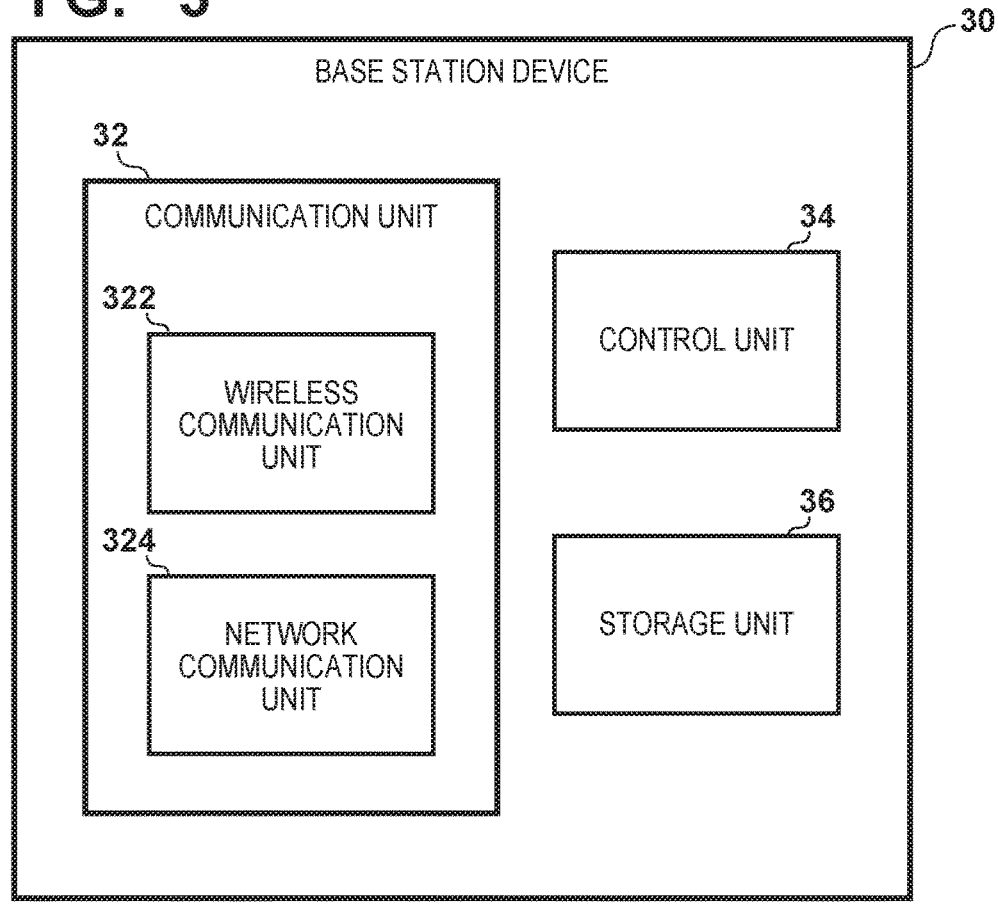
FIG. 3 is a block diagram showing an example of the arrangement of a base station device shown in FIG. 1.

FIG. 3 is a block diagram showing an example of the arrangement of the base station device 30 shown in FIG. 1. The base station device 30 includes a communication unit 32, a control unit 34, and a storage unit 36.

The communication unit 32 includes a wireless communication unit 322 and a network communication unit 324. The wireless communication unit 322 executes wireless cellular communication using a predetermined cellular method with a terminal device belonging to the communication area of the local station while the control unit 34 uses information stored in the storage unit 36. The network communication unit 324 executes inter-base station communication with another adjacent or second adjacent base station device via an X2 interface or the like, or performs communication with a host device via an S1 interface.

The communication unit 32 also transmits control information generated by the control unit 34 to the first terminal device 10. This transmission may be done by a broadcast signal. In addition, the communication unit 32 may transmit control information including information about an access type to the first terminal device 10. The communication unit 32 may transmit the control information to terminal devices located in the adjacent cells/second adjacent cells to the cell of the base station device 30 in addition to all first terminal devices 10 located in the cell of the base station device 30. The communication unit 32 may transmit the control information when the signal quality of the communication link of D2D communication between the first terminal device 10 and the second terminal device 20 or the signal quality of the communication link between the first terminal device 10 and the base station device 30 is equal to or less than a predetermined threshold, or when D2D communication has abnormally ended. Alternatively, in response to a terminal change request from the first terminal device 10, the communication unit 32 may transmit the control information to a terminal device that should be a new relay terminal.

In response to a D2D radio resource assignment request sent from a terminal device capable of executing D2D communication, the control unit 34 assigns some of radio resources of cellular communication as a D2D radio resource, and transmits a control message including information (D2D resource pool information) about the assigned D2D radio resource to the terminal device of the request source.

The control unit 34 also generates control information necessary for the first terminal device 10 to search for the second terminal device 20. As the control information, information including transmission setting information used to transmit a search signal from the first terminal device 10 to the second terminal device 20 or waiting setting information used by the first terminal device 10 to wait for a search signal from the second terminal device 20 is included. The transmission setting information may include a search signal transmission period and a timer concerning a search signal transmission time limit. Alternatively, the waiting setting information may include radio resource information to be waited and a timer concerning a waiting time limit.

To cause the first terminal device 10 that has received a signal from the communication unit 32 to determine whether to start searching for the second terminal device 20, the control unit 34 may set, as an access class (to be also referred to as an access class hereinafter), an access class to be given to a terminal device permitted to do an operation of searching for the second terminal device 20. Details of the access class will be described later.

The control unit 34 also transmits, to a terminal device under the control of the local station, a paging signal to instruct the terminal device to search for an out-of-area terminal that is not under the control of the local station. In addition, the control unit 34 generates control information concerning the operation of searching for an out-of-area terminal, and notifies the terminal device of it individually or by broadcast.

The operation of the wireless communication system having the above-described arrangement will be described next in accordance with each example or each modification to be explained below. Note that the examples and modifications are divided merely for a descriptive convenience and do not have an exclusive relationship. That is, those skilled in the art can easily understand that a different example can be constituted by an arbitrary combination of the elements of the examples and modifications. Note that in each example or each modification, the same reference numerals are used for already described components and operations, thereby simplifying the explanation. This applies throughout the specification.

Example 1

In Example 1, a method of, by a base station device, causing a relay terminal to transmit a search signal used to search for an out-of-area terminal to search for the out-of-area terminal that can perform D2D communication with the relay terminal and newly unexpectedly appears in a state unpredictable by the base station device will be described.

Figure 4:
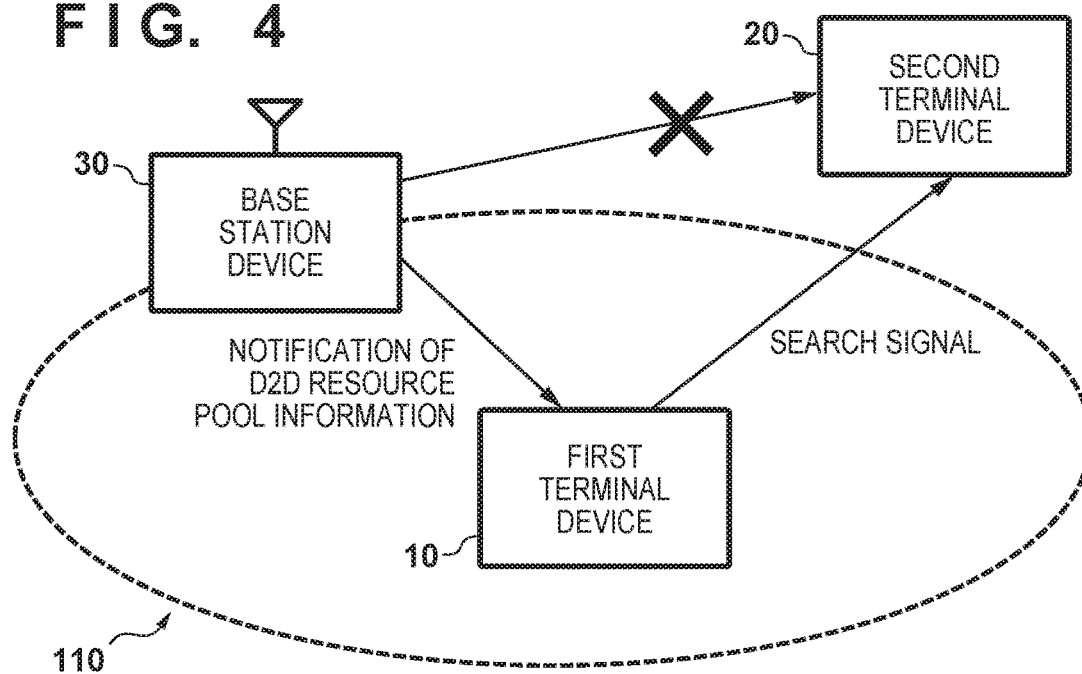
FIG. 4 is a block diagram showing an example of the arrangement of a wireless communication system according to Example 1.

FIG. 4 is a block diagram showing an example of the arrangement of a first wireless communication system 110 according to Example 1. A base station device 30 cannot directly know the presence of a second terminal device 20 that is not under the control of the local station. In addition, the second terminal device 20 that is not under the control of the base station device 30 cannot know D2D resource pool information of a first terminal device 10 that is under the control of the base station device 30. Hence, in Example 1, the first terminal device 10, which should serve as a relay terminal when the second terminal device 20 suddenly appears as a new out-of-area terminal, is explicitly instructed to search for the out-of-area terminal (paging processing) and simultaneously notified, individually or by broadcast, of control information concerning search signal transmission for the search of the out-of-area terminal. Alternatively, the base station device 30 may notify a period to execute the search of the out-of-area terminal and a search execution time, instead of explicitly instructing to search for the out-of-area terminal.

Figure 5:
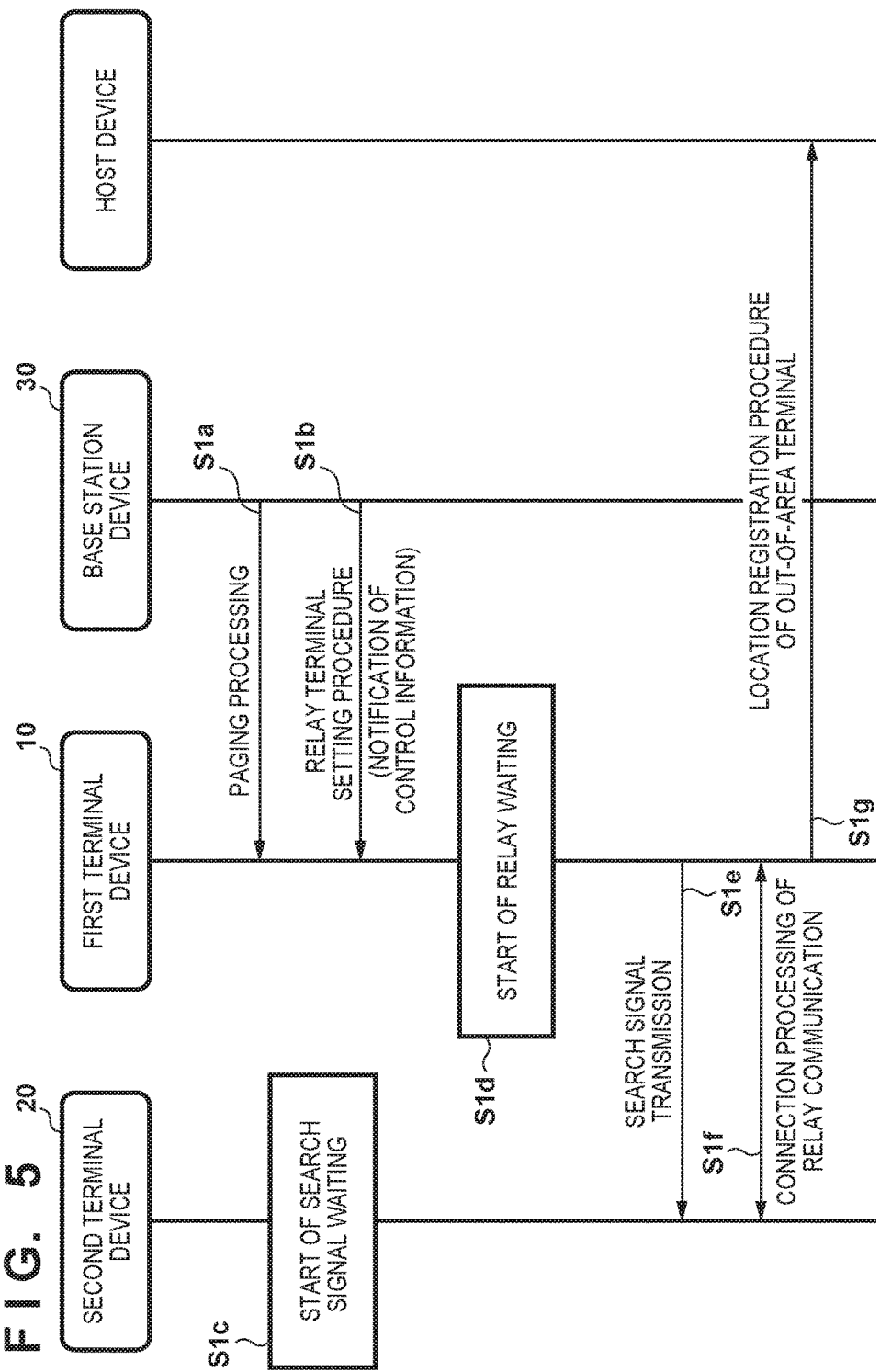
FIG. 5 is a sequence chart showing an example of the operation of the wireless communication system according to Example 1.

FIG. 5 is a sequence chart showing the operation of the wireless communication system according to Example 1. Note that details of paging processing of step S1a and the processing of the out-of-area terminal in the second terminal device 20 in FIG. 5 will be described later. This also applies to operation sequences according to other examples to be described later.

Based on reception of a paging signal from the base station device 30 (step S1a), the first terminal device 10 capable of operating as a relay terminal receives control information from the base station device 30 and performs a relay terminal setting procedure for execution of relay communication in the terminal (step S1b). For example, the control information from the base station device 30 can include an arbitrary combination of following information.

Control Information (Transmission Setting Information) Concerning Transmission of Search Signal Search signal transmission period
Search signal transmission duration (timer value)
Search signal transmission resource position
Search signal transmission frequency band
Search signal transmission power Note that as the search signal transmission resource position, an absolute position may be designated explicitly by a frequency offset value, a frequency index, and a time direction index, or a pattern of a resource in the time-frequency direction may be designated.

The second terminal device 20 out of the communication area starts waiting for a search signal from the relay terminal (step S1*c*). The first terminal device 10 starts relay waiting in accordance with the received control information (step S1*d*), and periodically transmits a search signal to the out-of-area terminal (step S1*e*). Upon receiving the search signal, the second terminal device 20 transmits a response to the search signal to the first terminal device 10 and performs connection processing of relay communication by D2D (step S1*f*). If connection of relay communication is completed, the first terminal device 10 performs a location registration procedure of the second terminal device 20 to the host device (step S1*g*).

As described above, according to Example 1, the base station device 30 instructs the relay terminal to transmit the search signal, thereby efficiently connecting the newly appearing out-of-area terminal to the wireless network via the relay terminal. In addition, this can be implemented with low power and a little delay by periodically transmitting the search signal.

Example 2

In Example 2, a method of, by a base station device, causing a relay terminal to wait for a search signal transmitted from an out-of-area terminal to search for the out-of-area terminal that newly appears will be described.

Figure 6:
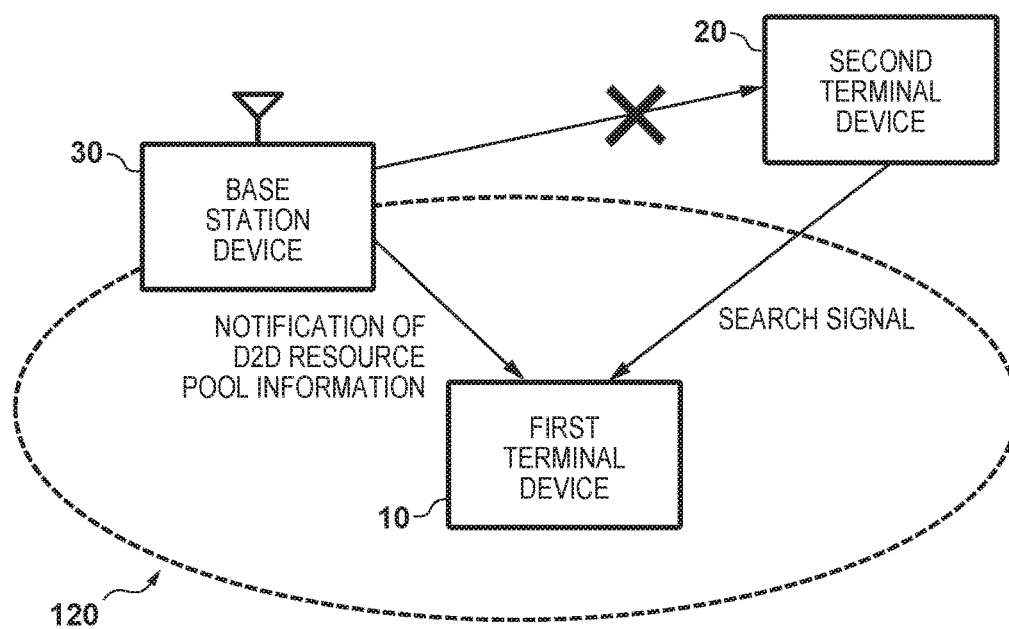
FIG. 6 is a block diagram showing an example of the arrangement of a wireless communication system according to Example 2.

FIG. 6 is a block diagram showing an example of the arrangement of a second wireless communication system 120 according to Example 2. A base station device 30 cannot directly know the presence of a second terminal device 20 that is not under the control of the local station. In addition, the second terminal device 20 that is not under the control of the base station device 30 cannot know D2D resource pool information of a first terminal device 10 that is under the control of the base station device 30. Hence, in Example 2, the second terminal device 20, which should serve as a relay terminal when the second terminal device 20 appears as a new out-of-area terminal, is explicitly instructed to search for the out-of-area terminal (paging processing) and simultaneously notified, individually or by broadcast, of control information concerning an operation of waiting for a search signal from the out-of-area terminal. Alternatively, the base station device 30 may notify a period to execute the search of the out-of-area terminal and a search execution time, instead of explicitly instructing to search for the out-of-area terminal.

Figure 7:
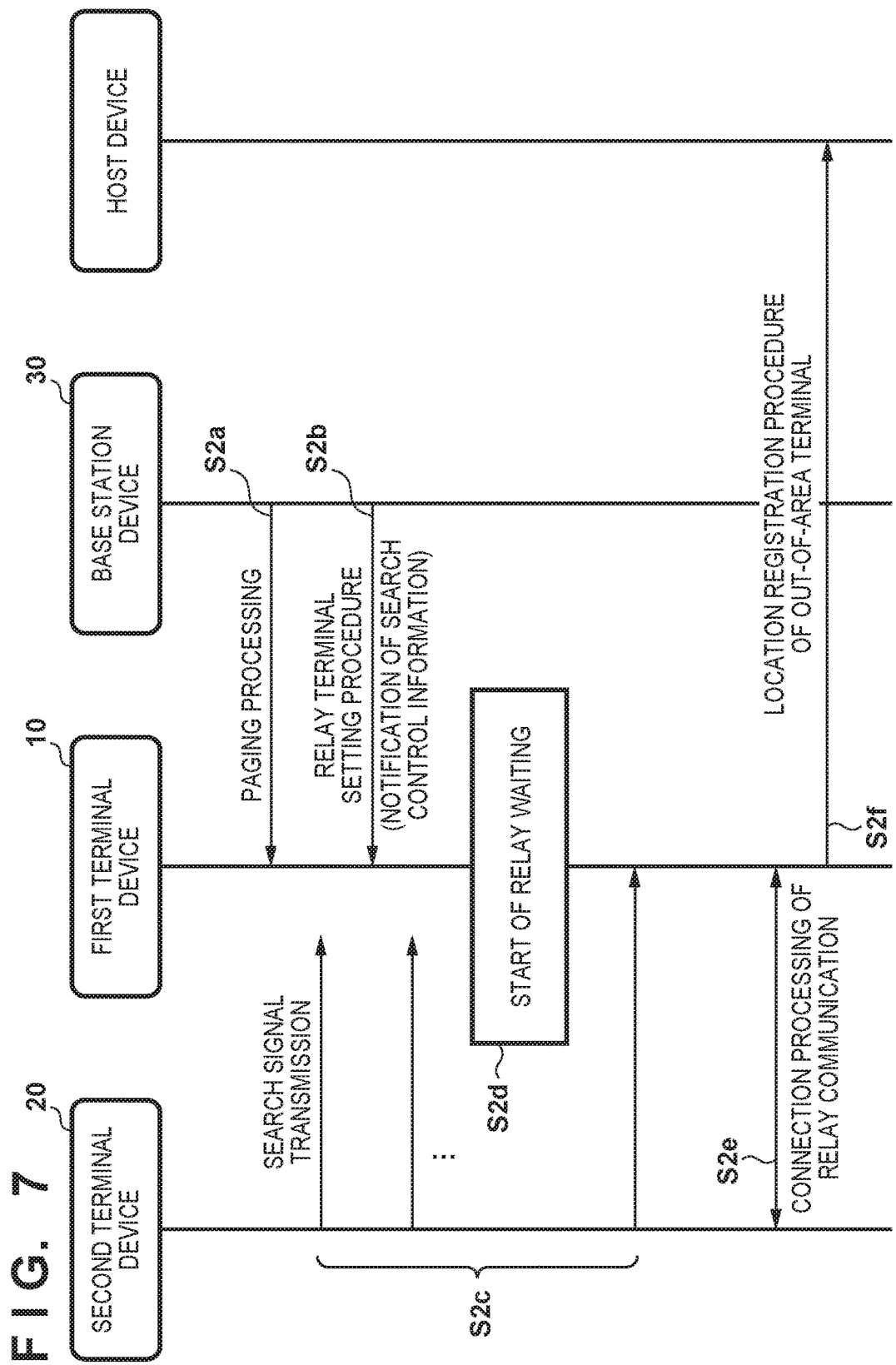
FIG. 7 is a sequence chart showing an example of the operation of the wireless communication system according to Example 2.

FIG. 7 is a sequence chart showing the operation of the wireless communication system according to Example 2. Note that details of paging processing of step S2*a* and the processing of the out-of-area terminal in the second terminal device 20 will be described later, as in Example 1.

Referring to FIG. 7, the first terminal device 10 capable of operating as a relay terminal receives a paging signal from the base station device 30 (step S2*a*). Based on the reception of the paging signal, the first terminal device 10 receives control information from the base station device 30 and performs a relay terminal setting procedure for execution of relay communication in the terminal (step S2*b*). Here, the control information from the base station device 30 can include, for example, an arbitrary combination of following information.

Control Information (Waiting Setting Information) Concerning Waiting of Search Signal Search signal waiting period
Search signal waiting duration (timer value)
Search signal waiting resource position
Search signal waiting frequency band Note that as the search signal waiting resource position, an absolute position may be designated explicitly by a frequency offset value, a frequency index, and a time direction index, or a pattern of a resource in the time-frequency direction may be designated.

The second terminal device 20 out of the communication area transmits a search signal periodically for a predetermined time (step S2*c*). The first terminal device 10 starts relay waiting in accordance with the received control information (step S2*d*), and waits for the search signal from the out-of-area terminal for a predetermined time. Upon receiving the search signal, the first terminal device 10 performs connection processing of relay communication by D2D with respect to the first terminal device 20 (step S2*e*). If connection of relay communication is completed, the first terminal device 10 performs a location registration procedure of the second terminal device 20 to the host device (step S2*f*).

As described above, according to Example 2, the base station device instructs the relay terminal to wait for the search signal, thereby efficiently connecting the newly appearing out-of-area terminal to the wireless network via the relay terminal. In addition, this can be implemented with low power and a little delay by periodically waiting for the search signal.

Example 3

In Example 3, a state is assumed in which during execution of relay communication as described in Examples 1 and 2, an out-of-area terminal that is executing the relay communication moves, and the relay communication with a relay terminal is interrupted.

Figure 8:
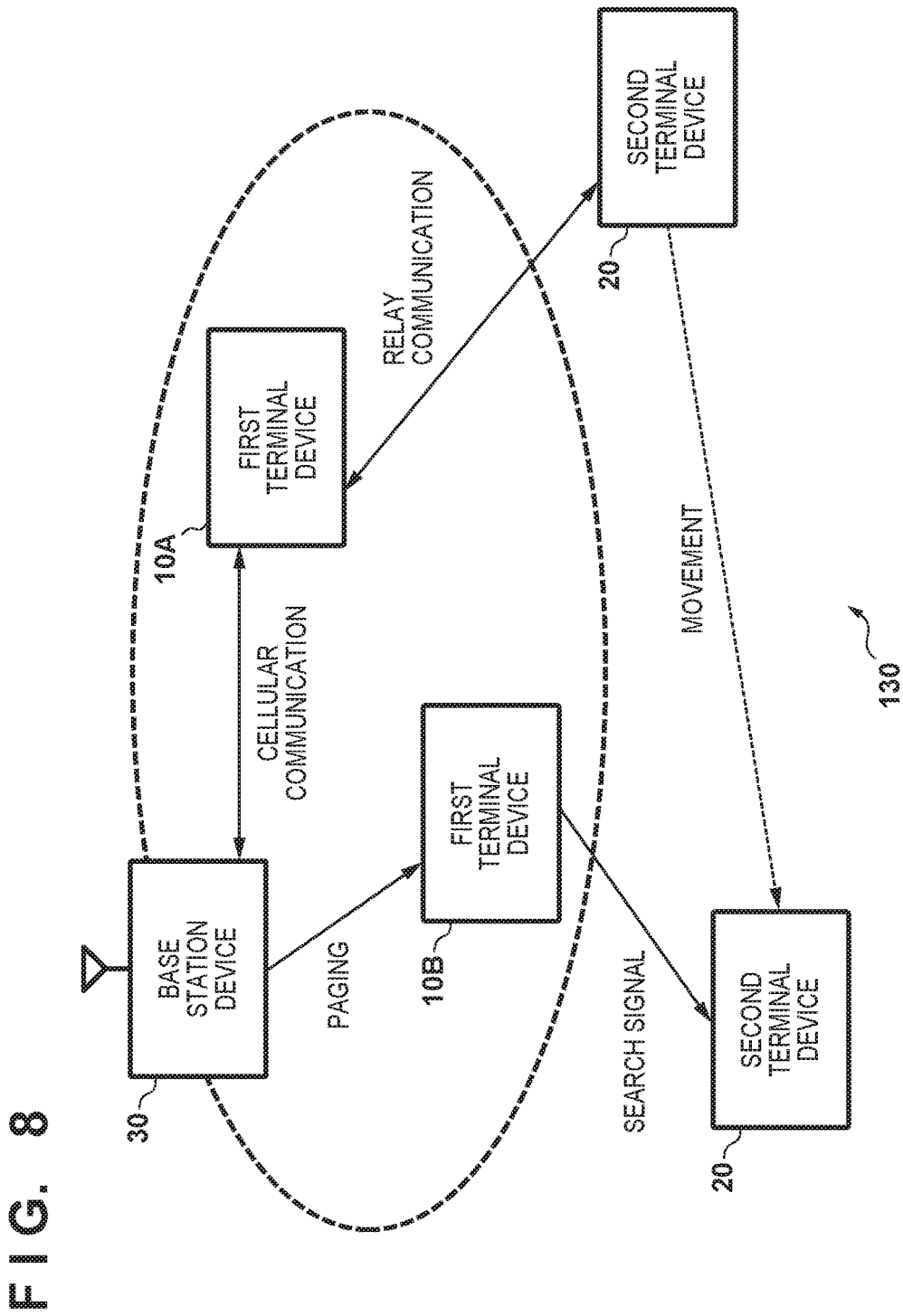
FIG. 8 is a block diagram showing an example of the arrangement of a wireless communication system according to Example 3.

FIG. 8 is a block diagram showing an example of the arrangement of a third wireless communication system 130 according to Example 3. Assume a case in which a second terminal device 20 is in a state in which it can be connected to a wireless network via a first terminal device 10A operating as a relay terminal, and along with the movement of the second terminal device 20 (to the first terminal device 10A), relay communication with the first terminal device 10A is disconnected. At this time, a new relay terminal needs to be set for the second terminal device 20.

Upon detecting, based on a quality report from the relay terminal, disconnection of the relay communication between the second terminal device 20 and the first terminal device 10A or disconnection of cellular communication between the first terminal device 10A and a base station device 30, the base station device 30 starts a connection procedure between the second terminal device 20 as the out-of-area terminal and a first terminal device 10B capable of operating as a new relay terminal. For example, the base station device 30 can determine disconnection of relay communication based on following three conditions or an arbitrary combination thereof.

(1) The signal quality of relay communication by D2D is equal to or less than a predetermined threshold.

(2) The signal quality of cellular communication between the relay terminal and the base station device 30 is equal to or less than a predetermined threshold.

(3) The session of relay communication by D2D is interrupted while leaving data under transmission.

Note that as the signal quality in (2), an RSRQ or RSRP value can be used. In a case in which one relay terminal provides relay communication to a plurality of out-of-area terminals, if the conditions are met for one relay communication, the base station device 30 can determine disconnection of the other relay communications as well.

Figure 9:
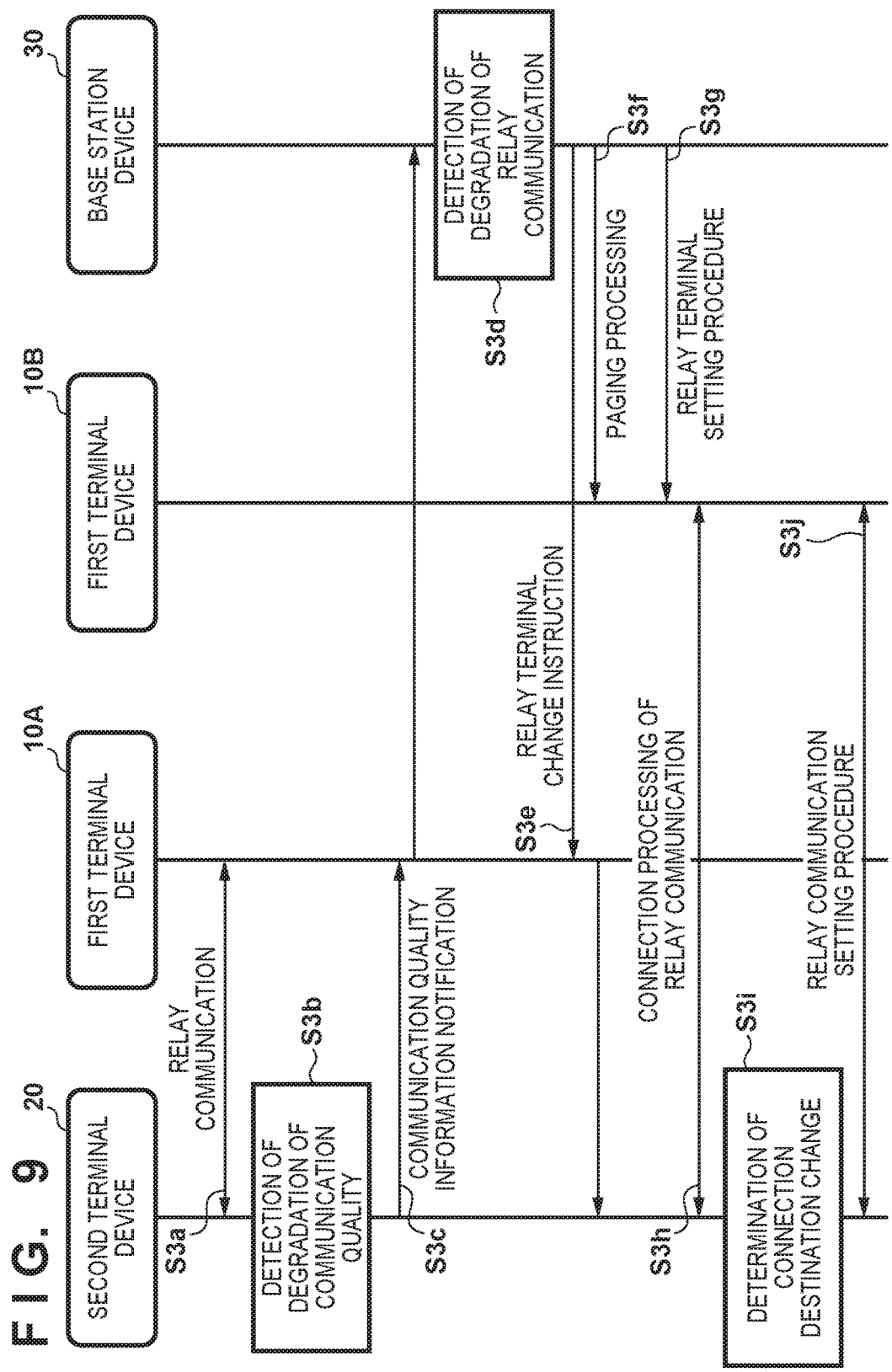
FIG. 9 is a sequence chart showing an example of the operation of the wireless communication system according to Example 3.

FIG. 9 shows an operation example in a case in which the base station device issues a relay terminal change instruction. Note that details of paging processing of step S3f and the processing of the out-of-area terminal in the second terminal device 20 will be described later as other examples in the last of the specification.

Referring to FIG. 9, the second terminal device 20 serving as an out-of-area terminal is performing relay communication by D2D with the first terminal device 10A operating as a relay terminal (step S3a). In this state, upon detecting that the communication quality of the relay communication is equal to or less than a predetermined threshold (detection of degradation) (step S3b), the second terminal device 20 notifies the base station device 30 of communication quality information via the first terminal device 10A (step S3c). Upon detecting the degradation of the relay communication by the communication quality information (step S3d), the base station device 30 transmits a relay terminal change instruction to the second terminal device 20 via the first terminal device 10A (step S3e).

The base station device 30 performs paging processing for the first terminal device 10B that is a terminal under the control of the base station and can operate as a relay terminal (step S3f), and notifies the first terminal device 10B of control information concerning an operation of searching for an out-of-area terminal as a relay terminal setting procedure (step S3g), as described in Example 1 or 2. Based on this notification, the first terminal device 10B performs transmission or waiting processing of a search signal (step S3h), as described in Example 1 or 2. If determining that the relay communication connection destination should be changed to the first terminal device 10B (step S3i), the second terminal device 20 performs a relay communication setting procedure for the first terminal device 10B as a new relay terminal (step S3j). Note that as the new relay terminal, a terminal capable of performing D2D communication with the out-of-area terminal and also capable of performing cellular communication with the base station device 30 is selected. In this selection, the terminal may be selected from a relay terminal candidate list successively updated in the base station device 30 based on quality reports periodically transmitted from terminal devices under the control or from a list of changeable terminal device candidates received from the out-of-area terminal.

As described above, according to Example 3, even in a case in which communication of the out-of-area terminal that is performing relay communication is interrupted, if the base station device sets a new relay terminal, the out-of-area terminal can continuously be connected to the wireless network.

Example 4

In Example 4, a case is assumed in which during execution of relay communication as described in Examples 1 and 2, an out-of-area terminal that is executing the relay communication moves, and the communication is interrupted, as in Example 3. Example 4 is different from Example 3 in that a relay terminal determines switching of the relay terminal and transmits a relay terminal change request to a base station device. Hence, a description of the same points as in Example 3 will be omitted, and different points will be explained.

Figure 10:
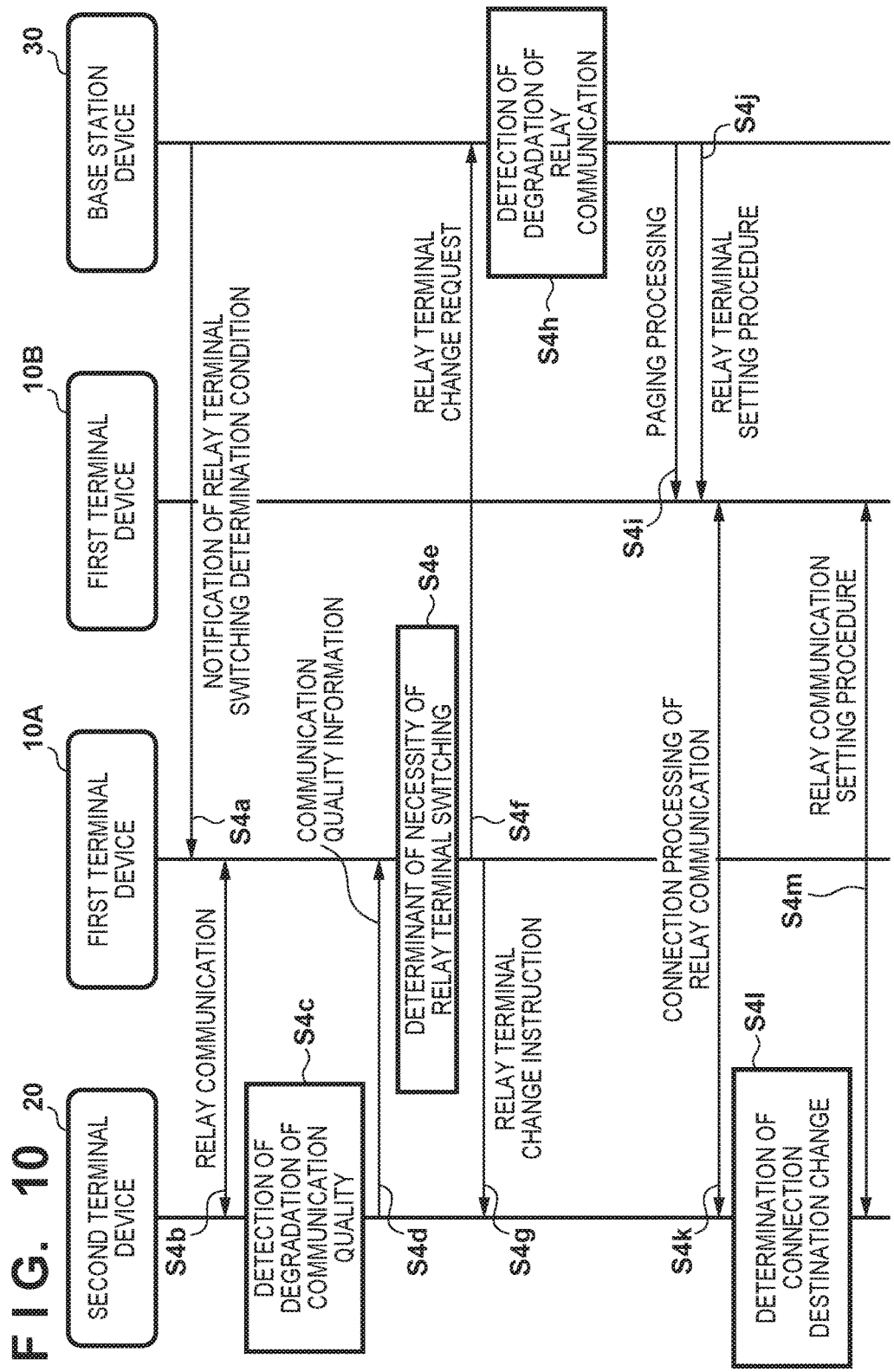
FIG. 10 is a sequence chart showing an example of the operation of a wireless communication system according to Example 4.

FIG. 10 shows an operation example in a case in which a relay terminal change request is transmitted to a base station device. Note that details of paging processing of step S4i and the processing of the out-of-area terminal in a second terminal device 20 will be described later, as in Example 1 and the like.

Referring to FIG. 10, a first terminal device 10A capable of operating as a relay terminal is notified of a relay terminal switching determination condition in advance (step S4a). The switching determination condition can be, for example, one of the conditions (1) to (3) described in Example 3 or a condition decided by an arbitrary combination of the conditions. Note that in a case in which the first terminal device 10A serving as a relay terminal provides relay communication to a plurality of out-of-area terminals, if the switching determination condition is met for one relay communication, disconnection of the other relay communications can also be determined.

The second terminal device 20 serving as an out-of-area terminal is performing relay communication by D2D with the first terminal device 10A operating as a relay terminal (step S4b). In this state, upon detecting that the communication quality of the relay communication is equal to or less than a predetermined threshold (step S4c), the second terminal device 20 notifies the first terminal device 10A of communication quality information (step S4d). The first terminal device 10A determines the necessity of relay terminal switching based on the communication quality information and the relay terminal switching determination condition notified in step S2a (step S4e). Upon determining in step S2e that relay terminal switching is necessary, the first terminal device 10A transmits a relay terminal change request to a base station device 30 (step S4f) and also transmits a relay terminal change instruction to the second terminal device 30 (step S4g).

Upon detecting the degradation of the relay communication by the relay terminal change request from the first terminal device 10A (step S4h), the base station device 30 performs paging processing for a first terminal device 10B that is a terminal under the control of the base station and can operate as a relay terminal (step S4i), and notifies the first terminal device 10B of control information concerning an operation of searching for an out-of-area terminal as a relay terminal setting procedure (step S2j), as described in Example 1 or 2. Based on this notification, the first terminal device 10B performs transmission or waiting processing of a search signal (step S4k), as described in Example 1 or 2. If determining that the relay communication connection destination should be changed to the first terminal device 10B (step S4l), the second terminal device 20 performs a relay communication setting procedure for the first terminal device 10B as a new relay terminal (step S4m).

As described above, according to Example 4, even in a case in which communication of the out-of-area terminal that is performing relay communication is interrupted, if the base station device sets a new relay terminal in response to the change request from the relay terminal, the out-of-area terminal can continuously be connected to the wireless network.

Modifications

As the modifications of the above-described examples, A-1 to A-3, B-1, and B-2 will be exemplified.

(A) Paging Processing

Paging processing performed by the base station device 30 for the relay terminal in each of the above-described examples can be A-1 to A-3 to be described below depending on the state of the relay terminal.

[A-1: If Relay Terminal Is in RRC_CONNECTED State]

The base station device 30 executes the relay terminal setting procedure for the relay terminal without executing the paging processing of step S1a.

[A-2: If Individual Paging Is Performed for Terminal in RRC_idle State]

On the side of the base station device 30 or host device, it is determined whether the first terminal device 10 can operate as a relay terminal. If the first terminal device can be the target, it is individually called. As for the selection criterion of the relay terminal to execute paging, paging is performed for a terminal whose RSRQ or RSRP value notified by a measurement report from the terminal is equal to or less than a predetermined threshold. Alternatively, paging is performed for a specific terminal set as a relay terminal in advance.

[A-3: If Broadcast Paging Is Performed for Terminal in RRC_idle State]

The base station device 30 executes broadcast type paging for terminals in the RRC_idle state located within a predetermined range. For example, the access class in the paging signal is set to a value different from that for a normal consumer. For a terminal capable of operating as a relay terminal device, this different value is set as the access class in advance. Hence, the terminal device can determine by itself whether it should operate as a relay terminal by confirming the access class in the paging signal. That is, even by the broadcast type paging, the paging instruction can reliably be issued to a terminal device that can be a relay terminal device. Note that the range of paging target terminals is selected from the cell, the cell and an adjacent cell or second adjacent cell to the cell, and the entire system. If connection of the out-of-area terminal to the relay terminal cannot be confirmed, another range may be selected, and paging may be executed again.

(B) Processing of Out-Of-Area Terminal

In each of the above-described examples, for execution of search signal transmission or waiting by the out-of-area terminal, the following cases B-1 and B-2 can be assumed depending on the network connected state of the out-of-area terminal.

[B-1: If Network in Different Frequency Band Exists]

Figure 11:
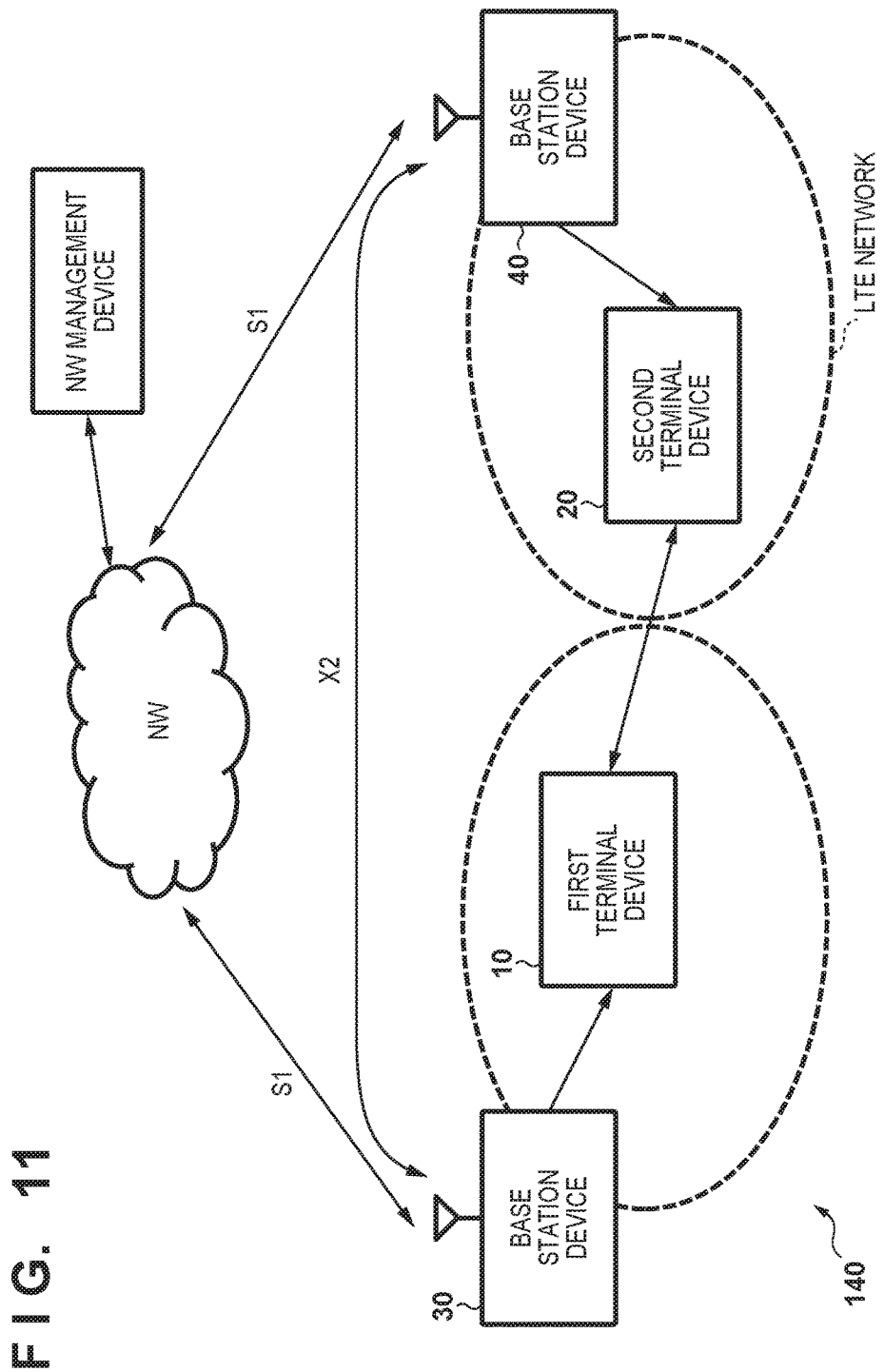
FIG. 11 is a block diagram showing an example of the arrangement of a wireless communication system in a case in which a network in a different frequency band exists.
Figure 12:
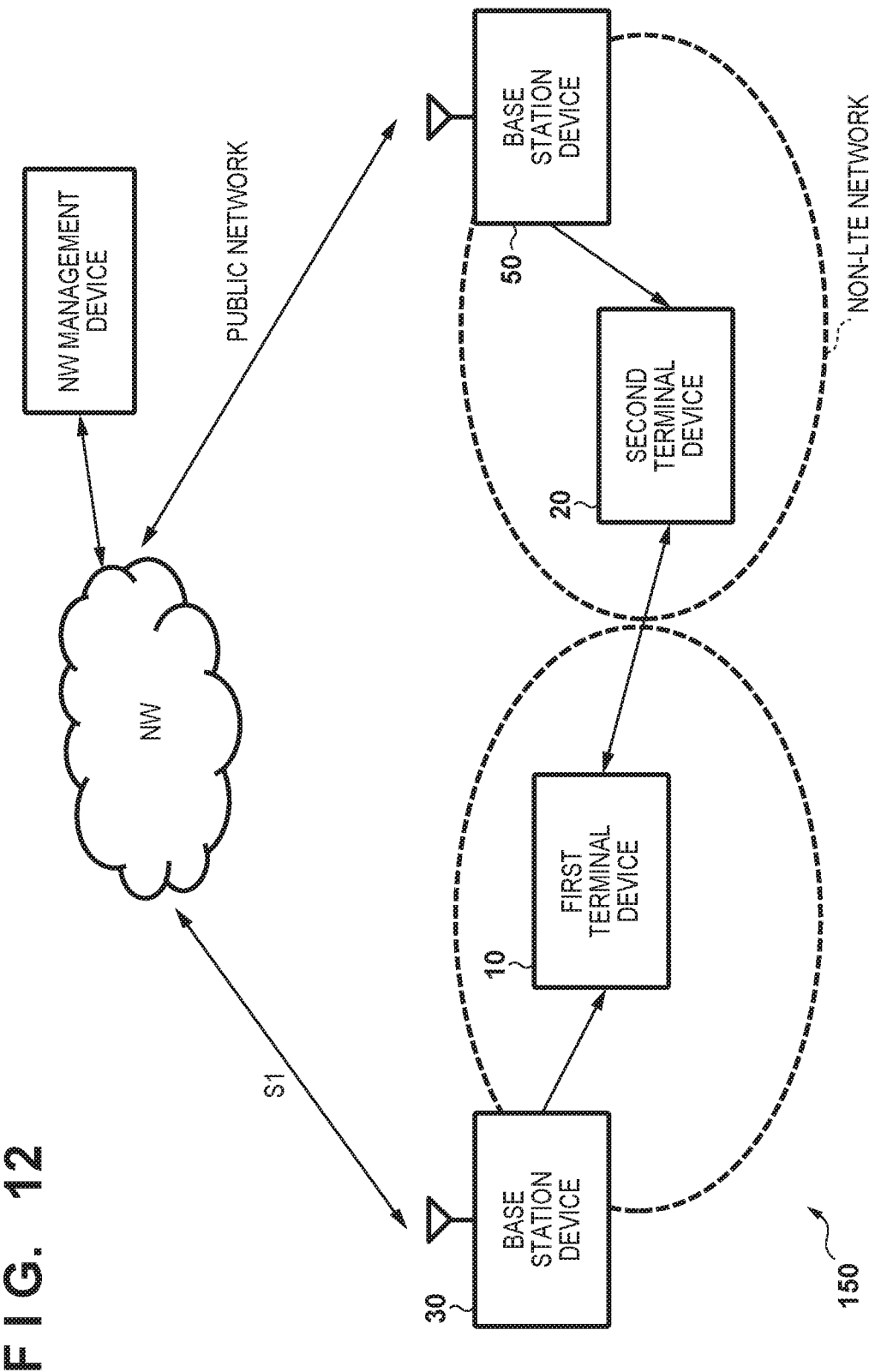
FIG. 12 is a block diagram showing another example of the arrangement of the wireless communication system in a case in which a network in a different frequency band exists.

B-1 will be described with reference to FIGS. 11 and 12. FIG. 11 is a block diagram showing an example of the arrangement of a fourth wireless communication system 140 in a case in which a base station device 40 of LTE exists as a different frequency band network. The base station device 30 can communicate with the adjacent or second adjacent base station device 40 via an X2 interface or S1 interface. FIG. 12 is a block diagram showing an example of the arrangement of a fifth wireless communication system 150 in a case in which a base station device 50 that forms a non-LTE network such as Wi-Fi® or Wimax® exists as a different frequency band network. In this case, the base station device 30 can communicate with the base station device 50 via an S1 interface and a public network.

Referring to FIG. 11 or 12, the second terminal device 20 that is not under the control of the base station device 30 receives control information concerning search signal transmission or waiting, which is transmitted from the base station device 30, via the base station device 40 or base station device 50 in the different frequency band, performs search signal transmission or waiting in accordance with the received control information to search for a relay terminal, and after the search, starts D2D communication. The control information is the same as that described in Example 1 or 2. The control information may be managed for each base station device or each terminal device by a host device such as a network management device, and may be notified from the host device or the base station device 30 to the base station device 50 in advance.

[B-2: If Network in Different Frequency Band Does Not Exist]

If the out-of-area terminal is performing relay communication, as in Example 3 or 4, the out-of-area terminal receives control information concerning search signal transmission or waiting from the base station device 30 via a relay terminal that is performing relay communication at a timing when the conditions (1) to (3) described in Example 3 or the like are met, and executes search signal transmission or waiting based on the control information. The notified control information is the same as that described in Example 1 or 2.

On the other hand, as in Examples 1 and 2, if a new out-of-area terminal appears, the out-of-area terminal cannot receive any signal from the base station device 30. For this reason, the out-of-area terminal may transmit or wait for the search signal for a predetermined period in a case in which, for example, a Public Safety capable bit or the like sets that the out-of-area terminal is a terminal permitted in advance to perform D2D communication, and the state in RRC_idle is an Any_Cell_Selection state (a state in which an appropriate connation destination cell is not found) and continues for a predetermined time. Note that the search signal transmission/waiting frequency band and resource position are determined in advance.

The present invention has been described based on examples. The present invention is not limited to the above-described examples and the contents of the examples, and can variously be changed and practiced in the scope of the present invention. The examples are merely examples, and various modifications can be made for the combination of the constituent elements or processes. Such a modification is also incorporated in the present invention as is apparent for those skilled in the art.

The present invention is not limited to the embodiment, and various changes and modifications can be made without departing from the spirit and scope of the present invention. Therefore, to apprise the public of the scope of the present invention, the following claims are made.

The invention claimed is:

1. A radio control device for controlling terminal-to-terminal communication in which wireless communication is performed directly without an intervention of a predetermined base station device between a first terminal device that is in a state in which wireless communication with the predetermined base station device can be executed and a second terminal device that is not in the state in which wireless communication with the predetermined base station device can be executed, the device comprising a communication device and a processor coupled to a memory, wherein the processor is configured to:
   generate control information necessary for the first terminal device to search for the second terminal device; and transmit the control information to the first terminal device by the communication device, when one of signal quality of a communication link of the terminal-to-terminal communication between the first terminal device and the second terminal device and signal quality of a communication link between the first terminal device and the base station device is not more than a predetermined threshold, or when the terminal-to-terminal communication has abnormally ended.

2. The radio control device according to claim 1, wherein as the control information, the radio control device generates information including one of transmission setting information used to transmit a search signal from the first terminal device to the second terminal device or waiting setting information used by the first terminal device to wait for the search signal from the second terminal device.

3. The radio control device according to claim 2, wherein the radio control device includes a search signal transmission period and a timer concerning a time limit of search signal transmission in the transmission setting information, or includes radio resource information to be waited and a timer concerning a waiting time limit in the waiting setting information.

4. The radio control device according to claim 1, wherein the communication device transmits the control information to the first terminal device by a broadcast signal.

5. The radio control device according to claim 1, wherein the communication device transmits the control information including information about an access type to the first terminal device, and
to cause a terminal device that has received a signal from the communication device to determine whether to start searching for the second terminal device, radio control device sets, as the access type, an access type to be given to a terminal device permitted to do an operation of searching for the second terminal device.

6. The radio control device according to claim 5, wherein the communication device transmits the control information to a terminal device located in an adjacent cell and/or a second adjacent cell to a cell of the base station device in addition to all first terminal devices located in the cell of the base station device.

7. The radio control device according to claim 1, wherein in response to a terminal change request from the first terminal device, the communication device transmits the control information to a terminal device that is determined to be a new relay terminal.

8. A terminal device that performs terminal-to-terminal communication in which wireless communication with a relay terminal device that is in a state in which wireless communication with a first base station device can be executed is performed directly without an intervention of the first base station device, and can execute wireless communication with a second base station device capable of communicating with the first base station device via a wired network, the device comprising a communication device and a processor coupled to a memory, wherein the processor is configured to:
receive, from the second base station device, search information notified from the first base station device to the second base station device to search for the relay terminal device by the communication device; and
execute control to search for the relay terminal device using the search information received by the communication device,
wherein the communication device receives, as the search information, search information including a search signal transmission period, a transmission time limit timer concerning a time limit of search signal transmission, radio resource information to be waited, and a waiting time limit timer concerning a time limit of waiting, and
the terminal device controls to transmit a search signal in accordance with the transmission period and the transmission time limit timer, and can wait for a response signal to the search signal in accordance with the radio resource information and the waiting time limit timer,
wherein the communication device receives the control information when one of signal quality of a communication link of the terminal-to-terminal communication between the first terminal device and the second terminal device and signal quality of a communication link between the first terminal device and the base station device is not more than a predetermined threshold, or when the terminal-to-terminal communication has abnormally ended.

9. The terminal device according to claim 8, wherein if the second base station device is in a state in which communication with the first base station device via the wired network cannot be executed,
the terminal device can transmit the search signal to the relay terminal device only when one or both of a condition that the terminal-to-terminal communication with the relay terminal device is permitted in advance and a condition that an appropriate connection destination cell does not exist are met.

10. A communication method in a communication system including a first terminal device that is in a state in which wireless communication with a base station device can be executed, a second terminal device that is not in the state in which wireless communication with the base station device can be executed, and a radio control device configured to control terminal-to-terminal communication in which wireless communication is performed directly between the first terminal device and the second terminal device without an intervention of the base station device, the method comprising:
in the radio control device,
generating control information necessary for the first terminal device to search for the second terminal device; and
transmitting the generated control information to the first terminal device, when one of signal quality of a communication link of the terminal-to-terminal communication between the first terminal device and the second terminal device and signal quality of a communication link between the first terminal device and the base station device is not more than a predetermined threshold, or when the terminal-to-terminal communication has abnormally ended,
in the first terminal device,
receiving the control information transmitted from the radio control device; and
searching for the second terminal device in accordance with the control information,
in the second terminal device, responding to the control information received from the first terminal device; and
in the first terminal device, executing the terminal-to-terminal communication with the second terminal device if a response from the second terminal device is received during a waiting period.

* * * * *